United States Patent [19]
Gardiner

[11] Patent Number: 5,870,098
[45] Date of Patent: Feb. 9, 1999

[54] METHOD FOR RENDERING SHADOWS ON A GRAPHICAL DISPLAY

[75] Inventor: Harold Dee Gardiner, Sandy, Utah

[73] Assignee: Evans & Sutherland Computer Corporation, Salt Lake City, Utah

[21] Appl. No.: 805,499

[22] Filed: Feb. 26, 1997

[51] Int. Cl.$^6$ .................................................. G06F 15/00
[52] U.S. Cl. ........................................................ 345/426
[58] Field of Search .................................. 345/419, 421, 345/425, 426, 427, 429, 430

[56] References Cited

U.S. PATENT DOCUMENTS

| | | | |
|---|---|---|---|
| 5,422,986 | 6/1995 | Neely ........................................ | 395/126 |
| 5,739,819 | 4/1998 | Bar-Nahum .............................. | 345/426 |
| 5,742,749 | 4/1998 | Foran et al. ............................. | 345/426 |

OTHER PUBLICATIONS

E&S Company, "A Method for Rendering Shadows", Sep. 25, 1996 by Dee Gardiner pp. 1–11.
Computer Graphics, vol. 21, No. 4, Jul. 1987 pp. 283–291 "Rendering Antialiased Shadow with Depth Maps".
"Casting Curved Shadows on Curved Surfaces", Lance Williams, Computer Graphics Lab, NY Institute of Tech, pp. 270–274, '78.
"A Survey of Shadow Algorithms", University of Tornonto, Nov. 1990, pp. 13–32.
"Fast Shadows & Lighting Effects Using Texture Mapping", Computer Graphics, 26, 2, Jul. 1992 pp. 249–252.
"Shadows in Harmony", Dee Gardiner, Shared Technology Version 0.0.1, 20 Sep. 1996, E&S Co., pp. 1–11.

*Primary Examiner*—Phu K. Nguyen
*Attorney, Agent, or Firm*—Thorpe North & Western, LLP

[57] ABSTRACT

A method for rendering a shadow cast from an object illuminated by at least one light source onto at least another object on a graphical computer display. The preferred embodiment enables the rendering of accurate and realistic shadows in real-time, consequently providing a realistic view of three-dimensional objects in two dimensions. The shadow can also provide more visual clues than are otherwise available from ambient light sources. In this way, more visual information is provided to an observer.

32 Claims, 6 Drawing Sheets

METHOD FOR RENDERING SHADOWS ON A GRAPHICAL DISPLAY

BACKGROUND

1. The Field of the Invention

This invention relates to displaying realistic images on a graphical display. More specifically, the present invention relates to the rendering of realistic shadows cast by displayed objects relative to the objects and a perceived light source to thereby provide greater realism or image enhancement to an image shown on a graphical display.

2. The State of the Art

The ability to accurately and rapidly render images on a graphical display is much sought after. Accordingly, a definition or understanding which will be useful in describing the invention is that the image of concern is not just a picture showing three-dimensional objects which cannot be manipulated; rather in the image of the present invention, at least one object which can be viewed on a graphical display may be manipulated by computational means. In other words, the objects we are concerned with are three-dimensional "things" which can be displayed realistically as a two-dimensional image.

A less abstract example which clarifies the definition above is shown in FIG. 1. Here a two-dimensional image is illustrated because it is drawn on a two-dimensional piece of paper. Likewise, FIG. 1 does not differ significantly from what would be displayed on a computer graphical display. However, despite being a two-dimensional image, the image appears to have depth because the image is rendered with perspective. In FIG. 1, the rendered image shows terrain or landscaping 10, a light source 12 and a three-dimensional object 14 which is disposed perpendicular to the underlying terrain 10. Given the location of the object 14 and the location of the light source 12, the object should cast a shadow relative to the light source 12. The area 16 shaded by the object 14 is simply shown for the sake of identifying the area 16 which should be shaded. The shaded area 16, however, is not yet rendered with a shadow.

FIG. 1 illustrates the concept that a perspective view of an object 14 gives an observer a sense of depth so that the object appears to be more real than a two-dimensional image. In other words, the purpose of a perspective view is to make a two-dimensional image appear three-dimensional. The relevance of this last statement is that an object 14 can appear to be more realistic and accurate if rendered properly.

The importance of rendering a realistic or more life-like image comes from the advantages to be gained from visualizing objects or scenes that do not exist, do not yet exist, or which exist but do not provide enough information (visual clues as to what is being viewed) when seen in reality. Particular examples will be described later. What should be remembered, however, is that a vital component of any realistic or enhanced image rendering process, and which is often ignored, is the casting and rendering of shadows. A shadow not only provides an obvious clue as to the direction of a light source, more importantly for displayed computer images, it enhances visual reality to help the mind believe what it is seeing.

Thus, while the importance of shadows in rendering realistic images on a computer display has long been recognized, the ability to accurately render them has been difficult. This difficulty can be summarized as a problem with rendering accurate shadows, realistic shadows and rendering shadows in real-time.

The subject of rendering of shadows has been researched since the early days of computer graphics. For example, the published papers of Frank Crow in *Shadow Algorithms for Computer Graphics*, and Lance Williams in *Casting Curved Shadows on Curved Surfaces*, addressed handling of shadow edges, or penumbra, to improve realism and to prevent aliasing. In 1987, William Reeves, et al. published *Rendering Antialiased Shadows with Depth Maps*, where an algorithm for antialiasing shadows with depth maps was presented. Andrew Woo, et al. presented a survey of shadow rendering techniques which had been implemented up to 1990. Those techniques included hard and soft edged shadowing, scanline approaches, using shadow volumes, area subdivision, depth buffering, ray tracing, cone tracing, radiosity, etc. The survey even addressed various culling schemes, transparency effects, and shadows caused by bumpy surfaces.

While rendering realistic shadows is difficult, the problem is compounded when the objects and/or scene are modeled by complex databases which contain a mathematical description of three-dimensional objects. In the past, non-real-time techniques have often turned to ray tracing or radiosity techniques to achieve realism. However, these techniques are not directly applicable to systems requiring fast rendering, such as in real-time or interactive image generators.

In 1992, Mark Segal, et al. introduced an algorithm for using texture mapping hardware to render shadows. The algorithm is based on the work of William Reeves and what others have done with depth maps. Segal showed that a rendering pipeline could be used in multiple passes to render the image from both the light source's perspective and the observer's perspective. The texture mapping hardware is used to transform from one space to another. More specifically, a scene is first rendered from the perspective of the light source. The resulting depth values are then transferred from a frame buffer to a texture memory. When rendering the scene from the observer's perspective, each pixel is transformed via the texture hardware into the light source's space where it is compared with the depth stored in the texture memory. If the image's depth is further than the texture depth, the pixel is in a shadow.

While the technique above has generated some impressive demos, it is not a useful technique for complex applications. For example, when rendering a scene from the light source's perspective, the level of detail may be completely different than the level of detail seen by the observer. This can cause inconsistencies in the shadows produced. These inconsistencies could even appear and disappear in sequential images, thereby causing distracting effects, as the eye position or light source moves. In addition, the cost of the hardware is doubled or tripled in order to accomplish the multiple passes.

Another problem is that because the resultant depth map must be converted to a texture map, it is very limited in its resolution. This can result in very coarse shadow images. This can be amplified if the light source is omni-directional. An omni-directional light source can illuminate any point in an image database, so the first pass rendering must have a field-of-view which completely encloses the observers field-of-view. This can severely limit the applied resolution.

Another problem is that the use of textures for the depth map increases the number of texture maps that must be applied to the polygon. The result is an increase in the rendering time which may exceed the limits of the hardware.

A last notable problems is that the depth texture map must be applied to the entire terrain model. This process involves complex clipping for any terrain triangle that is not completely enclosed by the shadow's texture map.

In summary, while many of the published shadow rendering techniques provide robust, general purpose solutions, none of the general solutions can be implemented in real-time hardware. What is needed is a shadow rendering technique which can be used to generate realistic and accurate shadows for display in real-time or interactively to thereby avoid the common problems cited above.

OBJECTS AND SUMMARY OF THE INVENTION

It is an object of the present invention to provide a method for rendering shadows in real-time or interactively on a graphical computer display.

It is another object to provide a method for rendering realistic shadows to enhance a visual experience of an apparently three-dimensional object being viewed in two dimensions.

It is still another object to provide a method for rendering accurate shadows in terms of viewing an object relative to a light source.

It is yet another object to provide a method for rendering shadows to provide an enhanced visual experience which is not visible to an unaided observer.

It is still another object to provide a method for rendering shadows which provides more visual clues to the observer about a scene or object which are otherwise difficult to see.

In accordance with these and other objects of the present invention, the advantages of the invention will become more fully apparent from the description and claims which follow, or may be learned by the practice of the invention.

The present invention is embodied in a method for rendering a shadow relative to an object and at least one light source on a graphical computer display. The preferred embodiment enables the rendering of accurate and realistic shadows in real-time, consequently providing a realistic view of three-dimensional objects in two dimensions.

In another aspect of the invention, the shadows can provide more visual clues than are otherwise available from ambient light sources. In this way, more visual information is provided to a observer.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Figure 1:
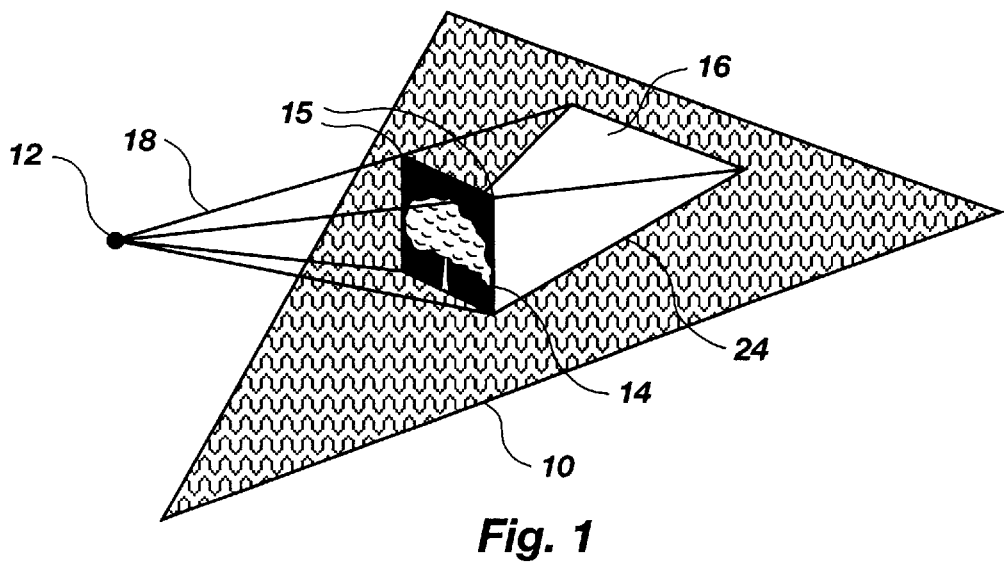
FIG. 1 is a two-dimensional perspective representation of three-dimensional objects, where there is underlying terrain, a light source and a three-dimensional shadow casting object (a tree) which casts a shadow over a region where a shadow should be rendered.

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the claims which follow.

The preferred embodiment of the present invention is advantageously presented as a solution to two distinct problems. Those problems are 1) where is the shadow, and 2) what does the shadow look like. These problems are perhaps more accurately characterized in a computer graphical sense as a projection problem and a rendering problem, respectively.

The computational problem of determining where a shadow lies can be a very complicated process if the object casting the shadow and/or the object on which the shadow lies are complex three-dimensional objects having complex surfaces. The calculation is further complicated if the light source, the object casting the shadow, or the object receiving the shadow can move or are in motion. Even more complications arise when multiple objects and light sources are involved. In these scenarios, the projection calculations must be recomputed for each scene that is rendered.

In the preferred embodiment of the present invention, the algorithms to be described are implemented in hardware or firmware to obtain real-time rendering of shadows. However, the algorithms can also be implemented without rendering hardware if a tradeoff in speed of rendering images with shadows is not an issue as will be understood by those skilled in the art. However, it should be sufficient to state in general terms that in the first step of the following method, standard projection techniques are used to determine "where" the shadow is supposed to be. After this determination, polygon illumination is used to render polygons with multiple texture maps. Finally, in the preferred embodiment, pixel rate Phong shading is used to realistically render the shadow(s).

In the preferred embodiment described above, the polygon illumination is accomplished via hardware. Likewise, the Phong shading is also accomplished via hardware to produce the fastest results. However, it is readily apparent to those skilled in the art that these functions can also be accomplished via software.

In essence, because the Phong shading algorithm can illuminate objects, it was discovered that the illumination calculations could in effect be disabled in regions (polygons) in which it is determined that a shadow lies.

The rendering problem is solvable using advanced lighting techniques to obtain the desired realism. While it was explained that in the preferred embodiment of the present invention that Phong shading will be used, it should be apparent to those skilled in the art after the following description that other lighting techniques can also be used.

To help understand how the present invention differs from the state of the art to solve the problem of shadow rendering state of the art methods are based upon the notion that something needs to be created to represent the shadow. However, in the real world, shadows are not things. On the contrary, shadows are simply a result of the lack of something, specifically—light. More specifically, shadows are regions on objects which are not directly illuminated by a particular light source.

The present invention takes advantage of both concepts, that a shadow can be represented by an object, and that a shadow is just a lack of light. Therefore in the preferred embodiment, an object functioning as a place holder is generated to represent the shadow within a database containing objects to be rendered. The place holder is referred to as a shadow polygon. The shadow polygon is then rendered correctly by not being illuminated by a light source causing the shadow.

It is also worth mentioning that the preferred embodiment describes a method which can be followed as an off-line modeling process if the shadow's location is fixed within the database. In other words, all of the objects impacting the shadow are fixed in space. However, in an alternative embodiment, the same general method can be followed interactively if any of the objects move.

In summarizing the present invention before examining FIG. 1 in greater detail, the present invention combines appearance attributes of a shadow receiving object with a shape attribute of a shadow casting object to correctly render a shadow. Projecting the shape attribute onto the shadow receiving object from a direction of a light source, creates a region that is in shadow. This shadow region has the same shape as the normal object casting the shadow, but the region is advantageously illuminated differently to thereby create the shadow. As will be explained in greater detail, the appearance attributes used to make the shadow more realistic include color or texture of the shadow receiving object. Finally, the Phong shading hardware is used to realistically render the shadow region. The shadow region does not apply light from the light source casting the shadow but does apply light from other light sources affecting the scene. Regions outside the shadow apply illumination from all light sources.

Figure 6:
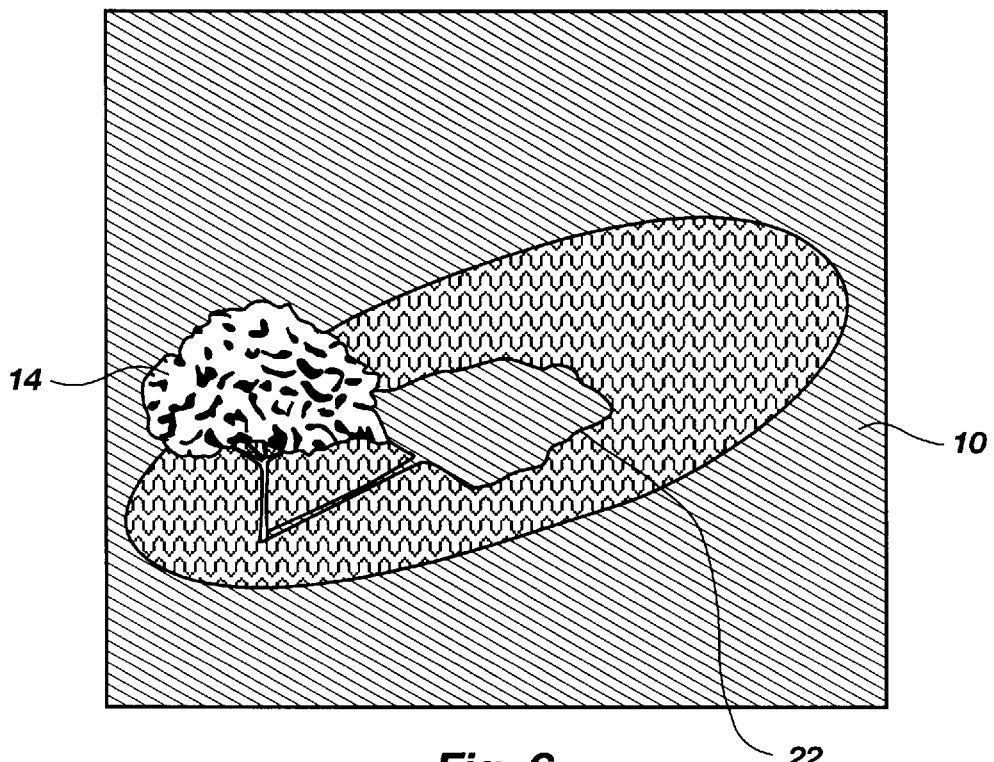
FIG. 6 shows the complete rendered perspective image of the tree illuminated by the spotlight, and with a correctly textured shadow of the tree.
Figure 9:
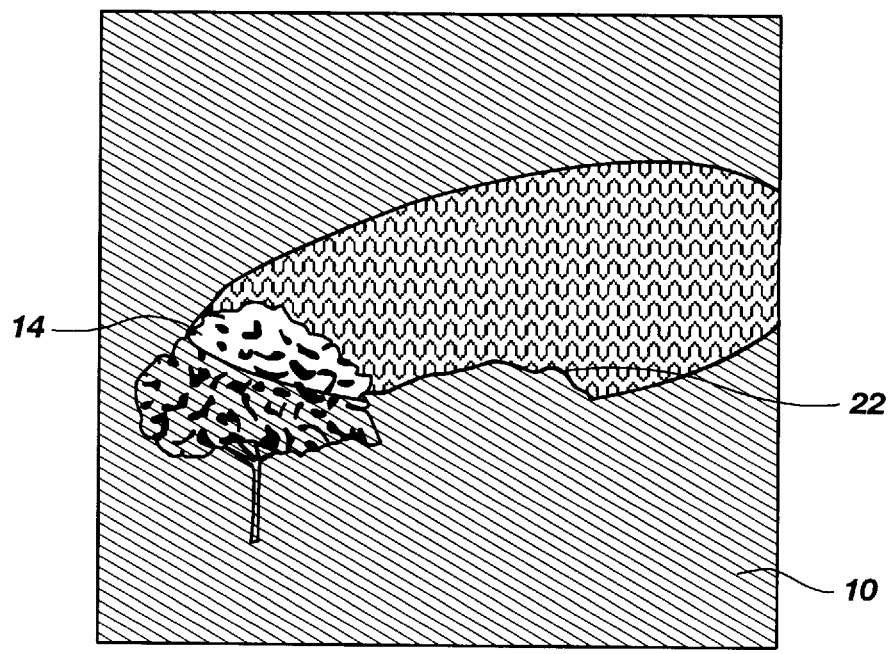
FIG. 9 shows an alternative embodiment of the completely rendered perspective image of the tree illuminated only partially by the spotlight, and with a correctly textured shadow of the tree.

FIG. 1 illustrates that the first step of the preferred embodiment of the present invention after mathematically defining a set of three-dimensional objects is to project the shadow onto an object or objects. In the example, the object is shown as an underlying surface or terrain 10. In this case, the object 14 casting the shadow is a picture of a tree. The picture will be referred to as a shadow casting object 14 which is always rotated to face the observer to give the illusion of a three-dimensional object in a final rendered image. This completed rotation of the shadow casting object 14 is shown in FIGS. 6 and 9. The shadow casting object 14 has a red, green, blue and alpha (RGBA) texture map. This texture map defines the appearance and shape attributes of the shadow casting object 14. However, it should be remembered that only the shape of the shadow casting object is relevant to the present invention. FIG. 1 has the alpha portion of the texture map disabled so that the polygon outline of the shadow casting object 14 and the projected polygon outline 24 of the shadow polygon 16 can be seen more readily. We can generate a shadow polygon 16 by casting rays 18 from the light source 12, through the vertices 15 of the tree polygon 14, and on to the underlying terrain polygon 10. Note that the orientation of the tree polygon 14 is at present perpendicular to the light source 12 for this projection, and not perpendicular to the position of the observer's eyes as it would be for normal rendering as shown in FIGS. 6 and 9.

The shadow polygon 16 generated as a result of the projection is coplanar with the terrain 10. It is therefore necessary that appropriate techniques now be used to insure proper rendering of coplanar surfaces 10 and 16 as understood by those skilled in the art.

It should be noted that FIG. 1 uses a point source of light 12, so the resulting projection is generated from the perspective of the position of the light source 12. However, if broader global area lights are used, the projection rays 18 would all be parallel when being emitted along a direction vector of the global light source instead of expanding from the point source 12. Nevertheless, the same projection concept applies in either case, only varying in that a smaller or larger shadow polygon 16 is created as a result of parallel or expanding projection vectors 18, respectively.

One of the more difficult steps which has not yet been mentioned when performing this projection is that of determining over which underlying polygons the shadow polygon 16 lies. It is essential to determine which polygon or polygons of the underlying terrain 10 that the shadow polygon 16 is projected, because the shadow polygon 16 will take on the appearance attributes of those polygons. This process can become increasingly complex if the shadow polygon 16 crosses polygon boundaries which define the underlying terrain 10 or projects onto moving three-dimensional shadow receiving objects. The following list identifies some of the cases that can increase the complexity.

1) The shadow polygon 16 projects across multiple underlying polygons. The shadow polygon 16 must then be clipped and conformed to each of the multiple underlying surfaces. It is likely that this case could be typical for shadows of three-dimensional objects onto terrain 10.

2) The shadow polygon 16 projects onto complex three-dimensional features. The shadow polygon 16 must then be clipped and projected onto the many surfaces representing the three-dimensional feature.

3) The position of the light source 12 changes. The projection must be computed on-the-fly, and all of the other complex rendering cases must be considered.

4) The shadow casting object's 14 position changes. This also requires on-the-fly calculations as in case 3.

5) Multiple light sources 12 casting shadows that overlap. The overlapping regions must be clipped and managed separately from the main shadows. This case can lead to complex circular priorities when managing light sources 12 and shadow polygons 16.

Figure 2:
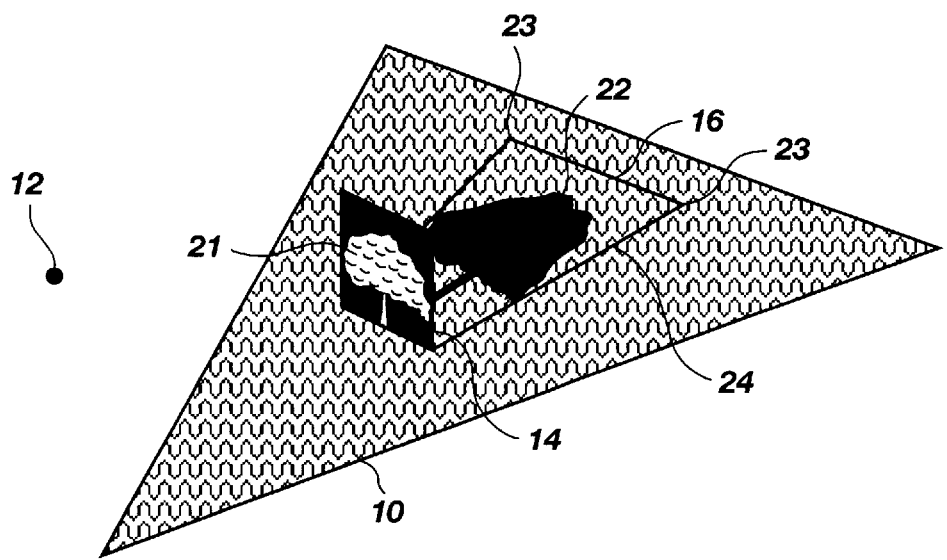
FIG. 2 is a rendered perspective image showing shadow detail. The alpha, or transparency, portion of the tree's texture map is used to generate a shadow cut-out or shape. The shadow polygon 16 on which the shadow shape lies is now identified with a black outline.

FIG. 2 shows that the next step in the method is to build a shadow cut-out shape 22 which is a copy of an object cut-out shape 21 "within" or "on" the shadow casting object 14. Thus, it bears emphasizing that while the shadow casting object 14 casts a shadow which generates the shadow polygon 16, the object cut-out shape 21 (in this case, the tree) which is on the shadow casting object 14 will actually be casting the visible shadow 22.

For emphasis, the shadow polygon 16 is also now identified with a black outline 24. Because in this embodiment the shadow casting object 14 uses texture to generate the object cut-out shape 21 (i.e. uses an alpha texture map), the same texture map is then used to generate the shadow (also be referred to as the shadow cut-out shape 22) on the shadow polygon 16. More accurately, FIG. 2 shows that a copy of the alpha texture map portion of the shadow casting object 14 is used to generate the shadow cut-out shape 22. In other words, the alpha texture map is being used to generate a more complex shape representing an outline of the tree to thereby generate the shadow 22.

In order to determine what is visible in the region defined by the shadow polygon 16 (whether the shadow polygon 16 is completely transparent to the underlying terrain 10, or more opaque), values are given to the alpha texture map which define transparency and opacity. Therefore, where an alpha texture map value is equal to one, this indicates that the tree's shadow 22 is visible over the underlying terrain polygon 10. In contrast, an alpha texture map value of zero indicates that the texture of the underlying terrain polygon 10 is visible "through" or "on top of" the shadow polygon 16, unaffected by the shadow 22. The alpha texture map values of one and zero are specific to this preferred embodiment. Obviously, other values can be used as long as they are consistent. It should be noted that fractional values are useful for the alpha texture mapping to show a blend of what is visible on the shadow polygon 16, thereby simulating a soft shadow edge, or penumbra (see item 28, FIG. 5).

By mapping the alpha texture map directly to the vertices 23 of the shadow polygon, the shadow cut-out shape 22 will advantageously and automatically stretch, shrink and otherwise distort as the shadow polygon 16 changes shape. Thus, as the light source 12 or the shadow casting object 14 move, the shadow cut-out shape 22 will automatically track along with the projection calculations.

In this preferred embodiment, the alpha texture map contains data which represents locations where or times when the shadow cut-out shape 22 is fully transparent (previously referred to as an alpha texture map value of zero), and when it is fully opaque (previously referred to as an alpha texture map value of one). Therefore, the alpha texture map can provide a natural blending region around the perimeter of the shadow 22 by specifying texture values between zero and one.

It is also possible to adjust a sharpness of a perimeter 28 (see FIG. 5) around the shadow cut-out shape 22 by selectively modifying the depth calculation on the MIP (Multum In Parvo) map. In the example shown in FIG. 2, a scale factor of 2.0 was used, which forces the rendering to one lower MIP level than normal, thus producing a lower resolution image of the tree's outline 28 (see FIG. 5). This results in a shadow 22 which looks softer than the tree 14, thereby giving the appearance of the penumbra of the shadow 22. If the depth scalar is left at 1.0, the shadow 22 appears too sharp, and therefore does not look natural or realistic. Furthermore, fractional MIP values can also be used to provide finer adjustments for shadow sharpness.

Figure 3:
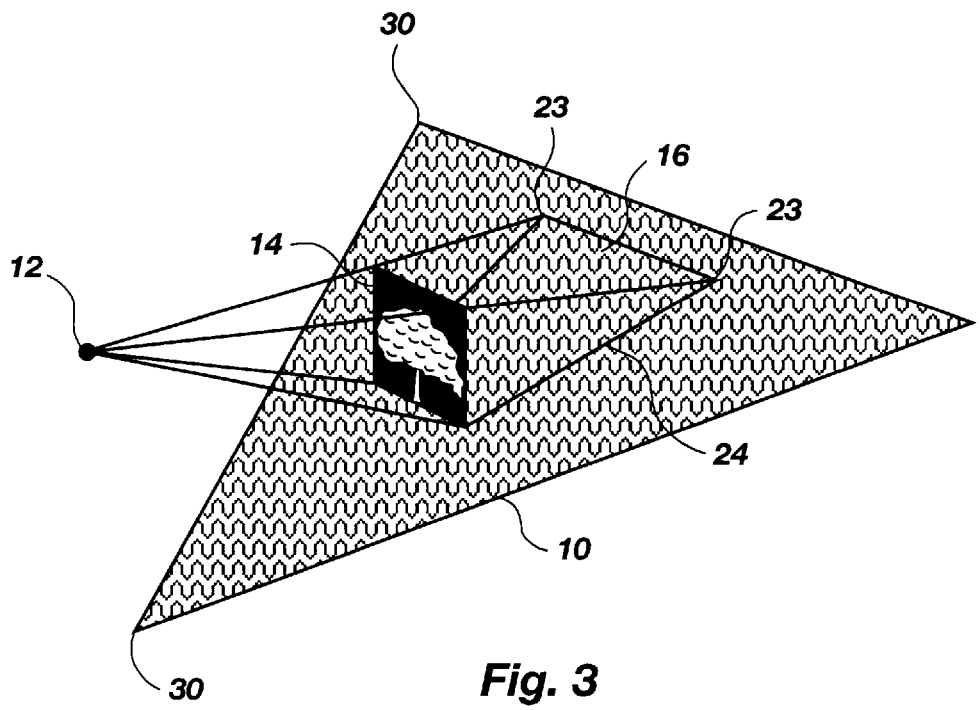
FIG. 3 is a rendered perspective image showing how the same textures are used to color the terrain polygons and the shadow polygons.

The next step in the method is to "paint" the shadow cut-out shape 22 (see FIG. 2) a proper color. It is undesirable for the shadow cut-out shape 22 to be just a dark spot. Instead, it is more accurate to state that the shadow cut-out shape 22 is a darkened piece of the terrain 10. This painting process is referred to as "inheriting" the color of the underlying terrain polygon 10 which is shown in FIG. 3. Inheriting the color of the underlying terrain polygon 10 should not be confused with the previously explained process of determining transparency and opacity of the shadow polygon 16. The areas of the shadow polygon 16 which lie outside of the shadow cut-out shape 22 should be fully transparent, allowing the terrain polygon 10 to "show through," undimmed by the shadow cut-out shape 22. However, the area defined by the shadow cut-out shape 22 would only appear as a dark area, devoid of detail such as texture or color. Enabling the shadow cut-out shape 22 to inherit the color (and/or texture) of the underlying terrain 10 adds realism to the shadow by not only giving the shadow cut-out shape 22 the shape of the shadow casting object, but also the correct color and texture of the terrain 10 on which the shadow lies.

Returning to the color inheriting process of FIG. 3, knowing how the vertices 23 of the shadow polygon 16 relate to the terrain vertices 30 of the terrain polygon 10 enables standard texture projection calculations to determine the coordinates of the terrain's texture at the vertices 23 of the shadow polygon 16. Using these coordinates and the same terrain texture map, the shadow polygon 16 appears exactly like a piece of the terrain 10 in FIG. 3. But it is important to remember that the shadow polygon 16 is only made to appear as if it is colored and textured just like the underlying terrain 10, while in fact it is a colored and textured shadow polygon 16.

However, if the projection of the shadow cut-out shape 22 changes on the terrain 10, the texture coordinates must also be recomputed based on a new location of the vertices 23 on the terrain 10. Thus, as the shadow cut-out shape 22 changes its shape as it moves over contours of the terrain 10, the color and the texture remain tied or coupled to the terrain 10, rather than stretching with the shadow cut-out shape 22 like the alpha texture map.

This concept is illustrated in FIG. 3 where the alpha texture map has been disabled for clarity. Therefore, it is now possible to observe that the shadow polygon's 16 texture (and color) exactly matches that of the underlying terrain 10 simply because the shadow polygon 16 is indistinguishable from the underlying terrain 10. The black outline 24 around the shadow polygon 16 is for illustration purposes only. Removing the black line 24 would result in no visible seam between the shadow polygon 16 and the surrounding terrain 10.

Figure 4:
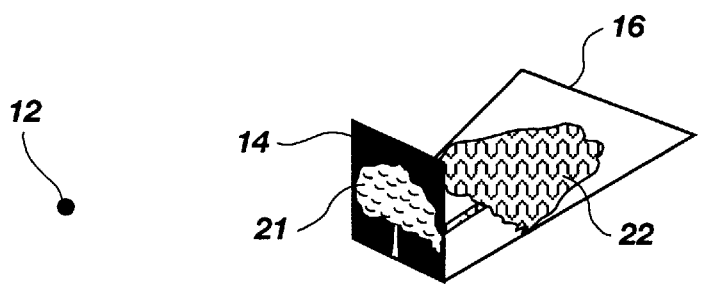
FIG. 4 is a rendered perspective image showing only the complete shadow polygon, having the color of the terrain from FIG. 3, and the shape of the tree from FIG. 2.

Having applied the texture of the underlying terrain 10 to the shadow polygon 16, the next step in the method is to combine the alpha texture map of the shadow cut-out shape 22 with the color map of the shadow polygon 16 and apply them to the shadow polygon 16 as shown in FIG. 4. This is done to generate the shadow cut-out shape 22 having the color of underlying terrain 10 combined with a shape in the form of the object cut-out shape 21. This is accomplished by applying the alpha texture map from the shadow casting object 14 as a composite mask over the RGB texture map from the terrain 10. The underlying terrain 10 has been removed for the sake of clarity. Notice that the RGB texture of the shadow cut-out shape 22 is the same texture as that of the underlying terrains 10 shown in FIG. 2, but in the shape of the tree 21.

Figure 5:
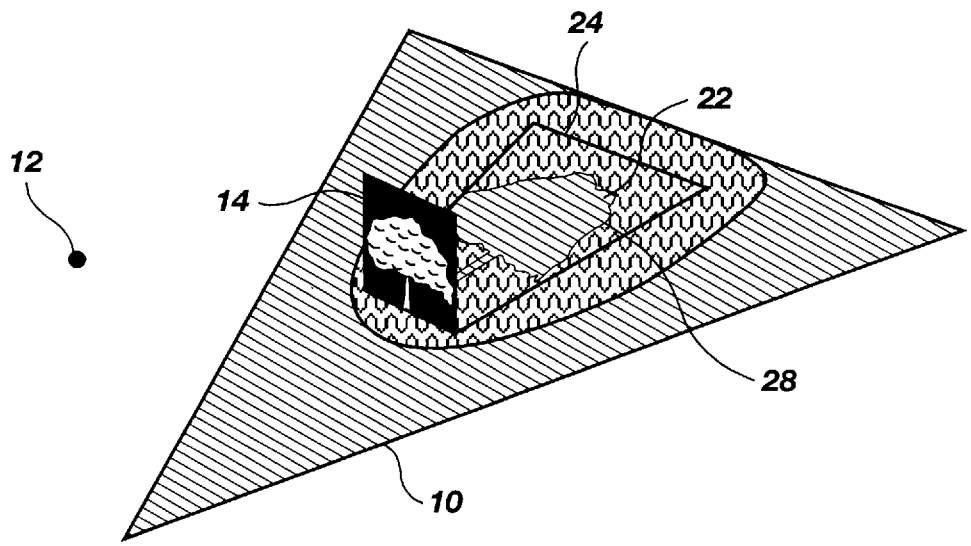
FIG. 5 is a more detailed rendered perspective image showing a properly colored and textured shadow being illuminated by a spot light source, except for where the tree (the shadow casting object) is not yet properly rendered.

Now that the shaded polygon 16 is complete, it is desirable to make the portion in the shadow to appear darker than the underlying terrain 10. In other words, the shadow cut-out shape 22 should have the shape of the shadow casting object 14, the color of the underlying terrain 10, but be darker than the underlying terrain 10 which is not in shadow. This is accomplished by controlling the Phong shading calculations. FIG. 5 shows more clearly what is trying to be accomplished. For illustration purposes only, the black outline 24 and the shadow polygon 16 are included for clarity. This figure was rendered by following the steps of:

1) enabling global light sources;
2) rendering the shadow polygon 16 by applying the global illumination;
3) enabling a directional spot light; and
4) rendering the shadow casting object 14 and terrain 10 using light from the global source and the spot light 12.

The shadow 22 is rendered with global light only, while the underlying terrain 10 receives light from the global light and from the spot light 12. Thus, the shadow polygon 16 and pixels of the terrain 10 outside the cone of illumination of the spot light 12 are lit by the global light only, while the pixels of the terrain 10 inside the cone of illumination are brighter because of the extra illumination from the spot light 12. Also, pixels along the perimeter 28 of the shadow 22 will have a blend of shadow brightness and terrain brightness, based on the alpha texture map value of the shadow.

FIG. 6 illustrates a final rendered image which is the goal of the method above. Observe that the shadow casting object 14 has been rotated to face the eye of the observer, instead of toward the spot light source 12 (not shown). The rotation toward the spot light source was only done for the projection calculation, not the rendering calculation. Also note that the alpha texture map has been re-enabled for the shadow casting object 14.

If the cone direction of the spot light 12 is moved, the cone of illumination will move accordingly. Furthermore, if the spot light 12 moves off of the shadow casting object 14, the shadow 22 will appropriately disappear, not because the shadow 22 is gone, but because the neighboring terrain pixels are also in shadow (i.e. they are outside of the cone of illumination, thus not illuminated, see FIG. 9).

Figure 7:
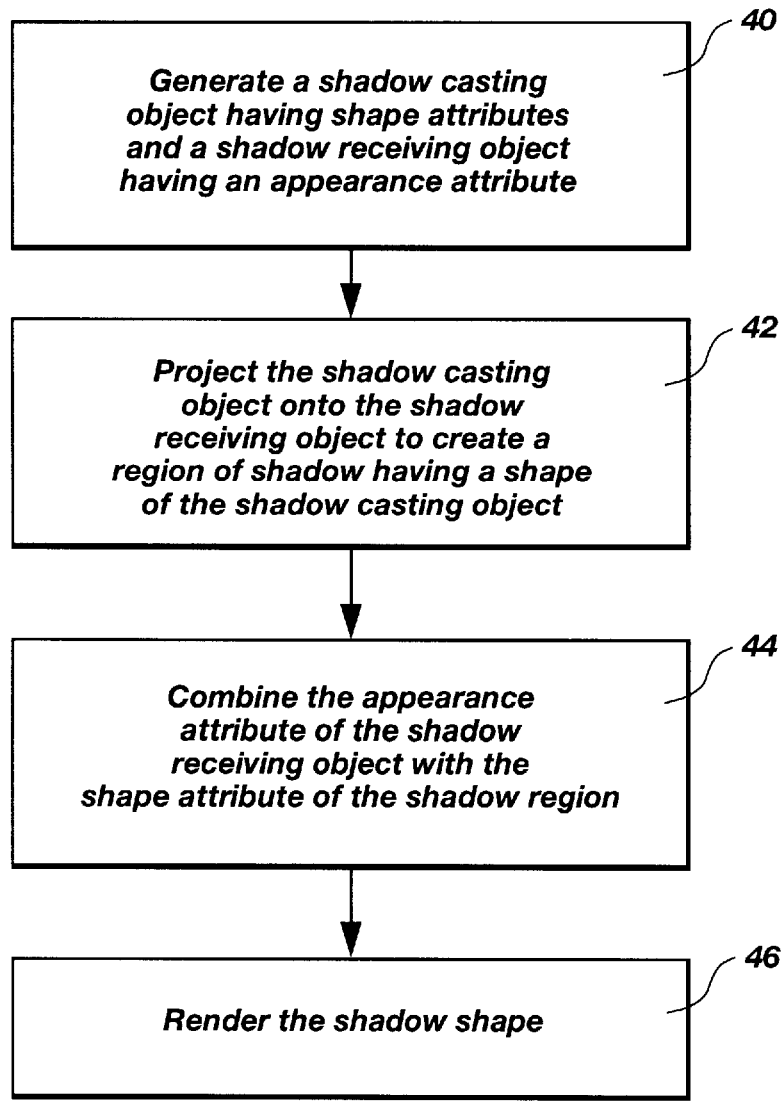
FIG. 7 is a flowchart of the basic steps of the present invention.

FIG. 7 is a flowchart which summarizes the basic steps of the method of the preferred embodiment of the present invention above. Step 40 is the step of generating a shadow casting object and a shadow receiving object, where the shadow casting object has a shape attribute and the shadow receiving object has appearance attributes. Step 42 is the step of projecting the shadow casting object onto at least a part of the shadow receiving object to thereby create a region of shadow having the shape of the shadow casting object. Step 44 is the step of combining the appearance attributes with the shape attribute to create a shadow shape having not only the correct shape, but appearance (color and/or texture) color as well. Finally, step 46 is the step of rendering the shadow shape using whatever method of rendering desired.

Figure 8:
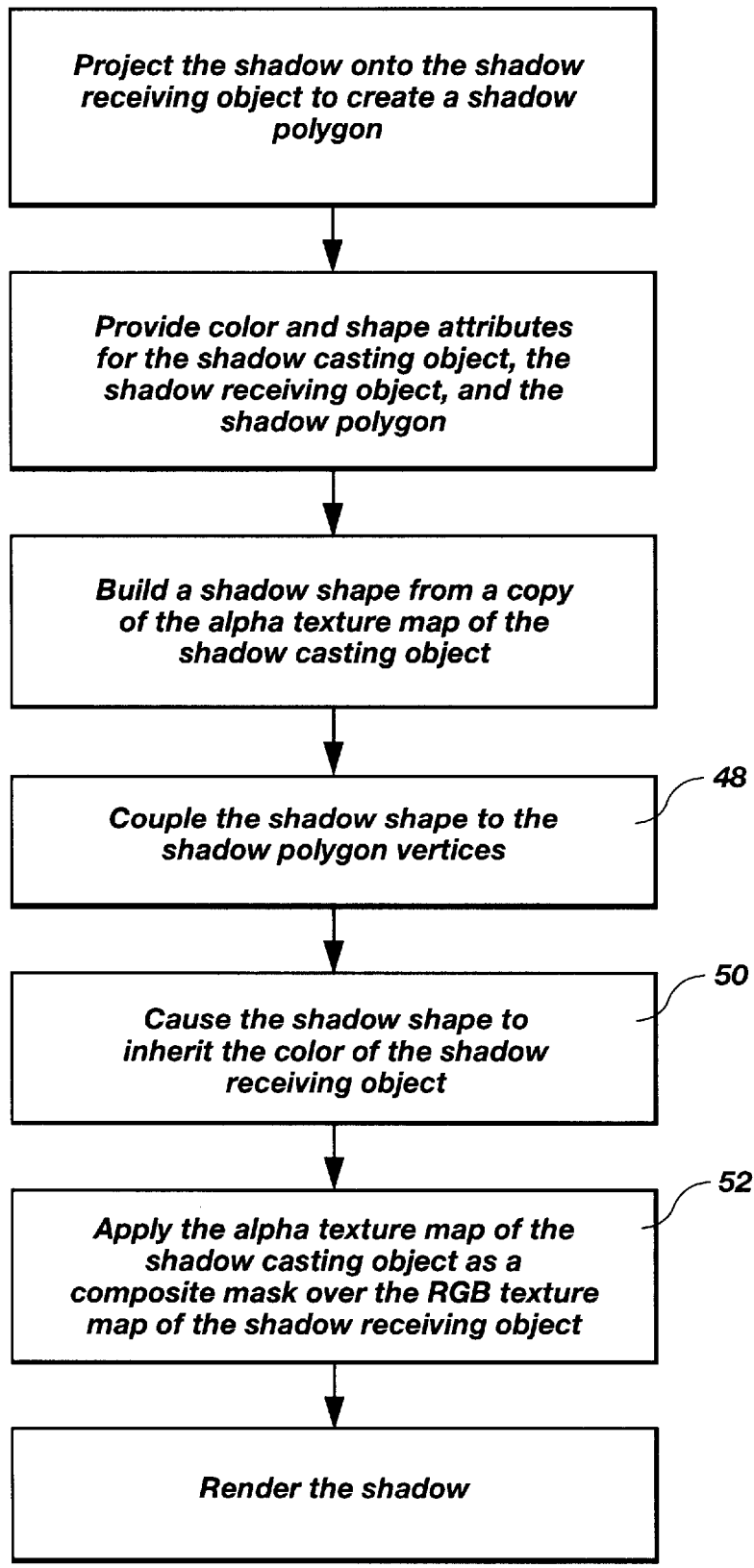
FIG. 8 is a more detailed flowchart of the basic steps provided in FIG. 7.

FIG. 8 is a more detailed breakdown of the steps outlined in FIG. 7 which also conform the preferred embodiments use of texture to be applied to the shadow shape. The flowchart provides particularly more detailed information in steps 48, 50 and 52. Specifically, step 48 states that the shadow shape is coupled to the shadow polygon so that the shadow shape will stretch and otherwise be distorted as the shadow polygon moves over complex surfaces without significant recalculations. Step 50 states that the shadow shape "inherits" the color of the shadow receiving object. As already described, this is accomplished by a simple copying of texture map information. Finally, step 52 describes how the alpha texture map of the shadow casting object is used as a composite mask over the RGB texture map of the shadow receiving object to complete shadow construction before it is rendered on the display.

FIG. 9 illustrates an image with the aim of the spot light 12 pitched upward so that only a portion of the shadow casting object 14 causes a shadow 22 on the terrain 10. Notice especially that the bottom portion of the shadow 22 properly matches the surrounding terrain 10.

In summary, it should be recognized that the method of the preferred embodiment of the present invention introduces at least three steps which are new to the industry of rendering shadows.

First, there is the step of compositing an alpha map (to obtain a shadow shape) from one object with the color map (or other appearance attribute such as texture) from another object. In other words, an alpha map is caused to stretch with a polygon together with a color map which slides across the polygon. Consequently, the shadow's shape can move dynamically as the light source 12 or the three-dimensional object 14 move, but the color (and/or texture) of the shadow 22 always stays tied to the terrain 10 or other underlying surface.

Second, there is the step of using MIP map depth control to simulate the shadows penumbra. By modifying standard MIP map texturing techniques, the texture sharpness can be adjusted by forcing the calculations to higher or lower MIP map levels of detail. This can appropriately be applied to approximate a shadow's penumbra.

Finally, there is the managing of Phong light sources to generate realistic rendering of shadows. While the state of the art relies on creating artificial objects to represent the shadow, the present invention takes advantage of sophisticated light models (Phong shading) to illuminate the scene in approximately a physically correct manner. By managing which Phong light sources in the scene apply to the shadow polygons, a highly realistic rendering can be achieved. These shadow renderings behave correctly as the light source 12 comes and goes, or as other light sources come and go.

Applications of the method of the present invention include using a rendered image to provide more visual clues to astronauts. Specifically, astronauts use shadows to help judge position and depth. NASA astronauts use the shadow of the remote manipulator arm to judge how close the arm is to the object they are trying to connect to. Shadows in space are very stark due to the lack of atmospheric light scattering. Items in shadows may be completely dark, while items in sunlight will be very, very bright.

Likewise, ground based simulations can also benefit from the shadows of three-dimensional objects such as trees, buildings, and vehicles. These shadows help tie the object to the ground. Without shading, the objects look as if they float above the ground, thereby making it difficult to accurately assess distance and position of moving vehicles. Shadows caused by flares can also be used to learn battlefield tactics.

Aircraft applications may be more concerned with terrain shadows. For example, a mountain casting a shadow over the valley, or a mountain casting a shadow over a shorter mountain. These types of shadows are extremely important for night vision goggle simulations since the shorter mountains may be invisible to the pilot.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

I claim:

1. A method for rendering a shadow in a computer graphics display system which generates three-dimensional information that is expressive of three-dimensional solid objects therein which cast and receive the shadow, wherein the method comprises the steps of:

(a) generating a three-dimensional shadow casting object having a shape attribute defining a corresponding shape and a three-dimensional shadow receiving object having at least one appearance attribute defining a corresponding appearance;

(b) generating a light source so that the shadow casting object is at least partially illuminated and oriented so as to cast the shadow at least partially onto the shadow receiving object, to thereby generate a shadow polygon also having a shape attribute and corresponding shape derived from the shadow casting object;

(c) combining the shape attribute of the shadow region and the at least one appearance attribute of the shadow receiving object to enable the shadow polygon to have an appearance of the shadow receiving object; and (d) utilizing shading algorithms to render the shadow region.

2. The method for rendering the shadow as defined in claim 1 wherein the step of generating a three-dimensional shadow receiving object having at least one appearance attribute more specifically comprises the step of providing a texture map as the at least one appearance attribute.

3. The method for rendering the shadow as defined in claim 2 wherein the step of generating a three-dimensional shadow receiving object having at least one appearance attribute more specifically comprises the step of providing color as the at least one appearance attribute.

4. The method for rendering the shadow as defined in claim 3 wherein the step of generating the shadow polygon more specifically comprises the step of projecting the shadow onto the shadow receiving object.

5. The method for rendering the shadow as defined in claim 4 wherein the step of projecting the shadow onto the shadow receiving object more specifically comprises the step of casting rays from the light source through all vertices of the shadow casting object to thereby generate the shadow polygon on the shadow receiving object.

6. The method for rendering the shadow as defined in claim 5 wherein the step of generating the shadow polygon more specifically comprises the steps of:

(a) determining whether a portion of the shadow polygon is coplanar with respect to the shadow receiving object; and (b) applying coplanar rendering techniques to coplanar surfaces where the shadow polygon is coplanar with the shadow receiving object.

7. The method for rendering the shadow as defined in claim 4 wherein the step of projecting the shadow onto the shadow receiving object more specifically comprises the step of casting parallel rays from a direction of the light source through all vertices of the shadow casting object to thereby generate the shadow polygon on the shadow receiving object when the light source is from an area source and not a point source.

8. The method for rendering the shadow as defined in claim 4 wherein the step of projecting the shadow onto the shadow receiving object comprises the more specific steps of:

(a) determining on which polygon or polygons of the shadow receiving object the shadow is to be projected; and (b) determining an appearance for each of the polygons on which the shadow is to be projected.

9. The method for rendering the shadow as defined in claim 8 wherein the step of projecting the shadow onto the shadow receiving object comprises the more specific steps of:

(a) determining whether the shadow is to be projected onto a plurality of surfaces of the shadow receiving object; and (b) if the shadow is to be projected onto the plurality of surfaces, clipping the shadow to conform to each of the plurality of surfaces.

10. The method for rendering the shadow as defined in claim 8 wherein the step of projecting the shadow onto the shadow receiving object comprises the more specific steps of:

(a) determining whether the shadow is to be projected by a light source which is moving; and (b) if the light source is moving, calculating the projection as the light source moves.

11. The method for rendering the shadow as defined in claim 8 wherein the step of projecting the shadow onto the shadow receiving object comprises the more specific steps of:

(a) determining whether the shadow is to be cast by a moving shadow casting object; and (b) if the shadow casting object is moving, calculating the projection as the shadow casting object moves.

12. The method for rendering the shadow as defined in claim 8 wherein the step of projecting the shadow onto the shadow receiving object comprises the more specific steps of:

(a) determining whether the shadow is to be projected onto a moving shadow receiving object; and (b) if the shadow casting receiving is moving, calculating the projection as the shadow receiving object moves.

13. The method for rendering the shadow as defined in claim 8 wherein the step of projecting the shadow onto the shadow receiving object comprises the more specific steps of:

(a) determining whether the shadow is to be cast by a plurality of light sources; and (b) if the shadow is to be cast by a plurality of light sources, overlapping regions of shadows must be clipped, projected, and managed separately.

14. The method for rendering the shadow as defined in claim 1 wherein the step of generating the shadow polygon onto the receiving object comprises the more specific steps of:

(a) generating the three-dimensional shadow casting object by using a corresponding alpha texture map to generate the shape of the shadow casting object; and (b) using said alpha texture map to generate the shape of the shadow on the shadow receiving object.

15. The method for rendering the shadow as defined in claim 14 wherein the step of using said alpha texture map to generate the shape of the shadow on the shadow receiving object comprises the more specific step of using a copy of the alpha texture map corresponding to the shadow casting object to thereby generate the shadow polygon.

16. The method for rendering the shadow as defined in claim 15 wherein the step of using the copy of the alpha texture map corresponding to the shadow casting object to thereby generate the shadow polygon comprises the more specific steps of:

(a) enabling the shadow of the shadow casting object to be visible over the shadow receiving object where the alpha texture map values indicate the shadow is visible; and (b) enabling the shadow receiving object to be visible where the alpha texture map values indicate the shadow receiving object is visible.

17. The method for rendering the shadow as defined in claim 16 wherein the step of using the alpha texture map values includes the more specific steps of:

(a) enabling the shadow of the shadow casting object to be visible over the shadow receiving object where the alpha texture map values are equal to one; and (b) enabling the shadow receiving object to be visible where the alpha texture map values are equal to zero.

18. The method for rendering the shadow as defined in claim 14 wherein the step of projecting the shadow onto the receiving object comprises the more specific step of mapping the alpha texture map directly to the shape of the shadow polygon to thereby enable the shadow to be distorted as the shadow polygon is distorted when tracking projection calculations.

19. The method for rendering the shadow as defined in claim 14 wherein the step of using the alpha texture map to generate the shape of the shadow comprises the more specific step of using texture values between 0 and 1 around a perimeter of the shadow to thereby provide a more realistic shadow.

20. The method for rendering the shadow as defined in claim 14 wherein the step of using the alpha texture map to generate the shape of the shadow polygon comprises the more specific step of selectively modifying sharpness of the perimeter of the shadow by selectively modifying a depth calculation of a MIP map.

21. The method for rendering the shadow as defined in claim 14 wherein the step of using the alpha texture map to generate the shape of the shadow polygon comprises the more specific step of selectively lowering a resolution of the shadow by lowering a MIP value.

22. The method for rendering the shadow as defined in claim 14 wherein the step of using the alpha texture map to generate the shape of the shadow polygon comprises the more specific step of applying color to the shadow polygon by inheriting all colors from the shadow receiving object.

23. The method for rendering the shadow as defined in claim 22 wherein the step of applying color to the shadow polygon comprises the more specific step of applying color from a color map of the shadow receiving object to color the shadow polygon.

24. The method for rendering the shadow as defined in claim 23 wherein the step of applying color to the shadow polygon comprises the more specific steps of:

(a) determining which colors of the color map of the shadow receiving object to apply to the shadow polygon by using projection calculations to determine which portion of the shadow receiving object is underneath the shadow polygon; and (b) applying the colors of the color map from the shadow receiving object which lie underneath the shadow polygon, to a color map of the shadow polygon.

25. The method for rendering the shadow as defined in claim 24 wherein the step of applying color to the shadow polygon comprises the more specific step of applying the alpha texture map of the shadow casting object to the shadow polygon to thereby apply the alpha texture map of the shadow casting object as a composite mask over the color map of the shadow receiving object.

26. The method for the shadow as defined in claim 25, wherein the step of utilizing the shading algorithms comprises the more specific step of making a portion of the shadow receiving object which is both outside of the shadow polygon and outside of the illumination from the light source a brightness corresponding to a brightness of the shadow polygon.

27. The method for rendering the shadow as defined in claim 1, wherein the step of utilizing the shadow algorithm comprises the more specific steps of:

(a) generating at least one local light source which is causing the shadow to be cast from the shadow casting object, generating at least another local light source which is not casting the shadow, and generating at least one global light source;

(b) rendering the shadow polygon while applying the at least one global light source and the at least another local light source; and (c) rendering the shadow casting object and the shadow receiving object using the at least one local light source, the at least another local light source, and the at least one global light source.

28. The method for rendering the shadow as defined in claim 1, wherein the step of utilizing the shading algorithms comprises the more specific step of using Phong shading hardware or software to render the shadow.

29. The method for rendering the shadow as defined in claim 1, wherein the step of utilizing the shading algorithms comprises the more specific step of illuminating the shadow polygon using less light than is being emitted from the light source causing the shadow.

30. A method for rendering a shadow in a computer graphics display system which generates three-dimensional information that is expressive of three-dimensional solid objects therein which cast and receive the shadow, wherein the method comprises the steps of:

(a) generating a three-dimensional shadow casting object optionally having a texture map and a three-dimensional shadow receiving object optionally having a texture map;

(b) generating a light source so that the shadow casting object is at least partially illuminated and oriented so as to cast the shadow at least partially over the shadow receiving object;

(c) disabling light source illumination calculations where the shadow is cast over the shadow receiving object to thereby generate a shadow region; and (d) utilizing shading algorithms to render the shadow region.

31. A method for rendering a shadow in a computer graphics display system which generates three-dimensional information that is expressive of three-dimensional solid objects therein which cast and receive the shadow, wherein the method comprises the steps of:

(a) generating a three-dimensional shadow casting object having a texture map and a three-dimensional shadow receiving object having a texture map;

(b) generating a light source so that the shadow casting object is at least partially illuminated and oriented so as to cast the shadow at least partially over the shadow receiving object to thereby generate a shadow polygon;

(c) generating a shadow shape from a copy of the shadow casting object texture map;

(d) coupling the shadow shape to vertices of the shadow polygon;

(e) causing the shadow shape to inherit all colors of the shadow receiving object;

(f) applying the shadow casting object texture map as a composite mask over shadow receiving object to complete the shadow; and (g) utilizing shading hardware to render the shadow.

32. A computer graphics system for rendering a shadow on a computer graphics display system which generates three-dimensional information that is expressive of three-dimensional solid objects therein which cast and receive the shadow, wherein the system is comprised of:

a display means for displaying a three-dimensional shadow casting object, a three-dimensional shadow receiving object, a light source and a shadow extending from the shadow casting object so as to at least partially obscure the shadow receiving object;

a processing means for calculating attributes of the shadow casting object, the shadow receiving object, the light source and the shadow, where the processing means includes separate illumination calculating means for determining how the light source illuminates the shadow casting object and the shadow receiving object; and shadow rendering means for rendering the shadow after the processing means has determined the shape of the shadow.

* * * * *